United States Patent [19]

Chen et al.

[11] 4,338,350
[45] Jul. 6, 1982

[54] CRYSTALLIZED, READILY WATER-DISPERSIBLE SUGAR PRODUCT

[75] Inventors: Andy C. C. Chen, Belle Mead, N.J.; Clifford E. Lang, Jr.; Charles P. Graham, both of Hicksville, N.Y.; Anthony B. Rizzuto, Piscataway, N.J.

[73] Assignee: Amstar Corporation, New York, N.Y.

[21] Appl. No.: 199,551

[22] Filed: Oct. 22, 1980

[51] Int. Cl.³ ............... C13F 1/02; A23G 1/00; A23F 1/00; A23G 1/187

[52] U.S. Cl. ............... 426/658; 426/659; 426/631; 426/640; 426/654; 426/661; 426/576; 426/577; 426/575; 426/573; 426/548; 426/579; 426/565; 426/593; 426/594; 426/597; 426/555; 127/29; 127/30

[58] Field of Search ............... 426/659, 658, 660, 661, 426/573, 576, 575, 666, 590, 548, 654, 629, 631, 578, 579, 615, 593, 584, 594, 597, 565, 566–567, 465, 467, 640; 127/29, 30

[56] References Cited

U.S. PATENT DOCUMENTS

| | | | |
|---|---|---|---|
| 1,467,007 | 9/1923 | Paine | 127/30 |
| 1,970,870 | 8/1934 | Skazin | 127/30 X |
| 3,169,888 | 2/1965 | Rizan | 127/30 |
| 3,194,682 | 7/1965 | Tippens | 127/30 |
| 3,305,447 | 2/1967 | Reimers | 127/30 X |
| 3,365,331 | 1/1968 | Miller | 127/30 |
| 3,656,971 | 4/1972 | Reimer | 426/659 |
| 3,656,972 | 4/1972 | Blomberg | 426/659 |
| 3,726,691 | 4/1973 | Seiden | 426/659 |
| 3,874,924 | 4/1975 | Sands | 426/659 |
| 4,159,210 | 6/1979 | Chen | 426/659 |

OTHER PUBLICATIONS

"Uses of Sugars and Other Carbohydrates in the Food Industry", No. 12 of the Adv. Chem. Series, pp. 126-131 ACS Wash. D.C., (1955).
U.S. Dept. Agr. Farmer's Bull. No. 1336 (1935) pp. 24-33.

Primary Examiner—Jeanette M. Hunter
Attorney, Agent, or Firm—Cooper, Dunham, Clark, Griffin & Moran

[57] ABSTRACT

A crystallized sugar product containing a food ingredient is prepared by concentrating a sugar syrup at a temperature in the range of about 250° F. to about 300° F. to a solids content of about 90 to 98% by weight, the sugar syrup containing no more than about 20% by weight non-sucrose solids, admixing the concentrated sugar syrup with a predetermined amount of the food ingredient, subjecting the admixture to impact bearing within a crystallization zone until a crystallized sugar product made up of aggregates of fondant-size sucrose crystals and the food ingredient is formed, the crystallized sugar product having a moisture content of less than 2.5% by weight, and recovering the crystallized sugar product from the crystallization zone. The resulting sugar product is dry, granular, free-flowing, non-caking, and readily dispersible in water. The resulting sugar product may be either an intermediate food product, such as a gelatin concentrate, or an instant food product, such as an instant chocolate pudding mix, which contains all of the dry food ingredients for the final food product.

37 Claims, 1 Drawing Figure

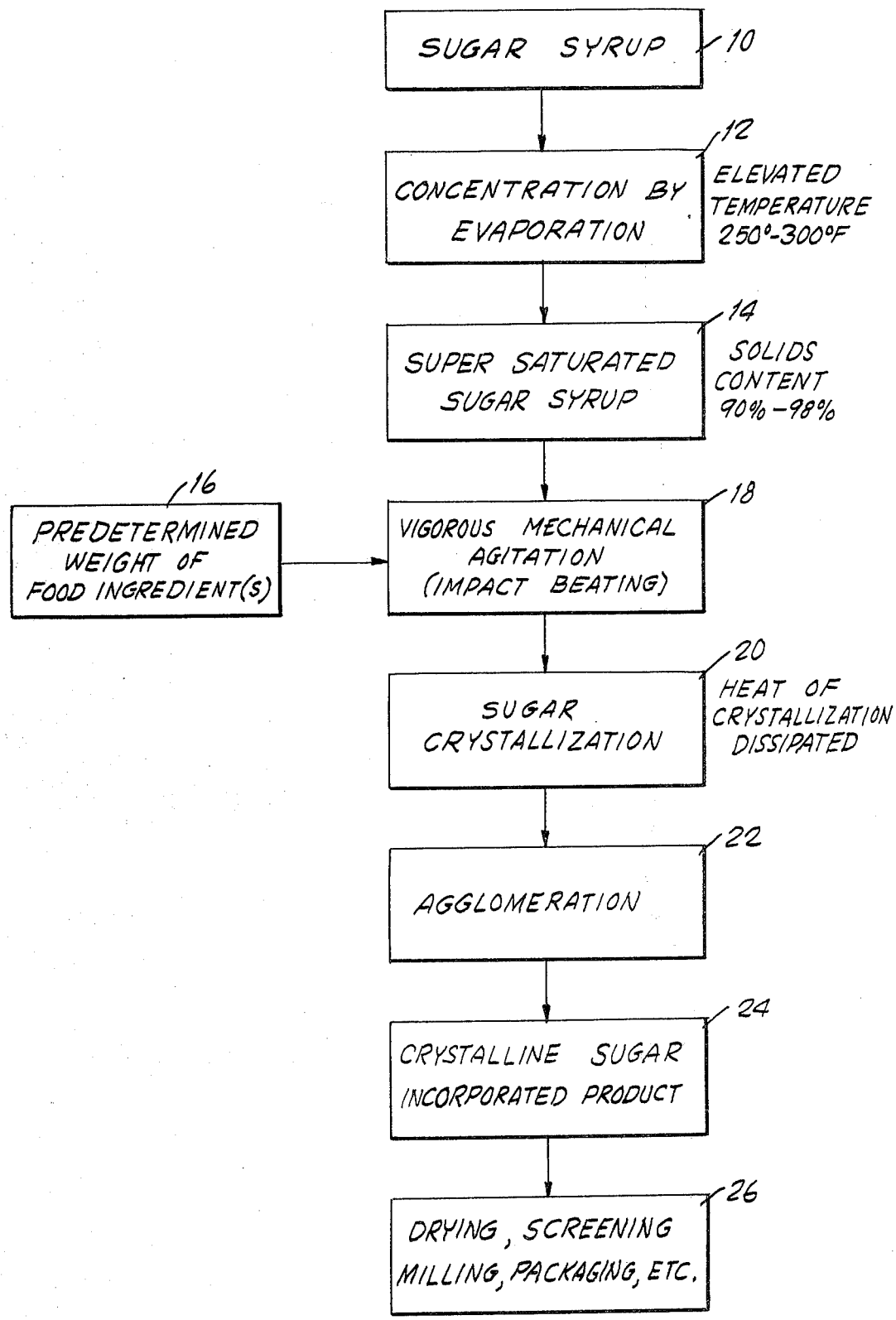

CRYSTALLIZED, READILY WATER-DISPERSIBLE SUGAR PRODUCT

BACKGROUND OF THE INVENTION

This invention relates to a granular, free-flowing, non-caking sugar incorporated product. More specifically, this invention relates to a crystallized and readily water-dispersible sugar incorporated product and to a method for producing the sugar incorporated product.

Many food ingredients are sold by the food industry in powder or granular form. For example, gums, gelatin, emulsifiers, starches, cocoa and flavorants, which are used as thickening, stabilizing, gelling, coloring and flavoring agents in food products, are sold in powder form.

Food ingredients which are used in powdered form are not totally satisfactory. Because of their high affinity for water, these powdered food ingredients are not readily dispersed in water. The granules tend to clump together and float on the surface when they are mixed with liquids. In general, vigorous agitation while heating is needed to dissolve or disperse powdered food ingredients in liquids.

Other problems also exist with powdered food ingredients. Powdered food ingredients have a tendency to cake upon standing and an additive is needed to prevent this. Powdered food ingredients are mechanically blended. It is difficult to obtain a uniform blend of the powdered food ingredients because they separate or settle out upon standing. Consequently, in order to use the correct proportions of ingredients in a package, the consumer must use the entire package rather than just a part of the package. Another problem is that a percentage of the blend components is lost as dust during mechanical blending.

"Instant" food products, that is, powdered food products which contain all of the food ingredients in a single package, encounter the same problems of difficulty of dispersion, tendency to cake, tendency to settle out, and dust losses.

It would be desirable to produce powdered food ingredients which avoid these problems.

It would also be desirable to produce instant food products which avoid these problems.

In the manufacture of sugar products, a process known as the transforming process is used to convert a sugar syrup into a dry sugar product. The sugar product is granular, free-flowing, non-caking, and is readily dispersed or dissolved in water. The transforming process has been described in U.S. Pat. Nos. 3,149,682 (Tippens et al.), 3,365,331 (Miller et al.), 4,159,210 (Chen et al.), and our copending, co-assigned application entitled "Crystallized, Readily Water-Dispersible Sugar Product Containing Heat Sensitive, Acidic or High Invert Sugar Substances." In Tippens et al., the method comprises concentrating a sugar syrup to a solids content of about 95-97% by heating the sugar syrup to a temperature of about 250°-265° F., and subjecting the resulting supersaturated sugar syrup to a heat dissipation operation simultaneously with vigorous agitation. The method produces a dry sugar product comprising aggregates of fondant-size (3-50 microns) sucrose crystals. Miller et al. describes a similar process in which impact beating is used to crystallize the sugar product from the supersaturated sugar syrup.

The feed syrup which is employed in the processes of Tippens et al. and Miller et al. has a purity in the range of 85-97% by weight sucrose. Thus, the feed syrup may not contain more than about 15% by weight non-sucrose solids.

Both Tippens et al. and Miller et al. disclose that sugar products prepared in accordance with their invention are useful as carriers for additive materials which may have a food value or a taste value or a color value or medicinal value or the like. The food additive may be added at any step in the process, such as during concentration, crystallization, comminution, screening, or by a separate blending and mixing operation with the sugar product, depending on the nature of the additive material.

Theoretically, it is possible to adapt the sugar transforming process so that a food ingredient is crystallized with the sucrose crystals from a sugar syrup containing the food ingredient. The resulting product would be granular, homogeneous, dry, free-flowing and non-caking. In addition, because the structure of the product would be porous clusters of micro-sized sucrose crystals intimately associated with the food ingredient, the food ingredient would be readily dispersible or dissolvable in liquid.

Accordingly it is an object of this invention to provide a product which incorporates a food ingredient into a crystalline sugar matrix.

It is also an object of this invention to provide this sugar product in dry, granular, free-flowing, non-caking form.

It is also an object of this invention to provide this sugar product in a form in which the food ingredient is readily dispersed or dissolved in liquid.

it is also an object of this invention to provide a sugar product which contains all of the dry food ingredients needed to make a final food product.

It is also an object of this invention to provide a method for preparing this sugar product.

These and other objects are accomplished by means of the present invention described below.

SUMMARY OF THE INVENTION

By means of the present invention, a crystallized sugar product is prepared which incorporates a food ingredient into a sugar matrix. The product is homogeneous, dry, granular, free-flowing, and non-caking. The product is composed of agglomerates or aggregates of minute, fondant-size sucrose crystals intimately associated with the food ingredient. Due to its porous structure, the crystallized sugar product is readily dispersed or dissolved in water.

The crystallized sugar product of the present invention is prepared by concentrating a sugar syrup at a temperature in the range of about 250° F. to about 300° F. to a solids content of about 90 to 98% by weight, said sugar syrup containing no more than about 20% by weight non-sucrose solids; admixing the concentrated sugar syrup with the food ingredient; subjecting the mixture to impact beating within a crystallization zone until a crystallized sugar product made up of aggregates of fondant-size sucrose crystals and the food ingredient is formed, the crystallized sugar product having a moisture content of less than 2.5% by weight; and recovering the crystallized sugar product from the crystallization zone. If desired, the resulting crystallized sugar product may be dried to a moisture content of less than 1% by weight, followed by screening to a uniform size and packaging.

DETAILED DESCRIPTION OF THE INVENTION

The accompanying drawing is a flow chart illustrating a preferred process or scheme for preparing a crystallized sugar product in accordance with the present invention.

Referring to the flow chart, a feed sugar syrup 10 is concentrated by evaporation 12 to a supersaturated sugar syrup 14 having a solids content of about 90 to 98%. Concentration of the feed syrup is performed at an elevated temperature in the range of about 250°–300° F., and may be performed at atmospheric pressure or under vacuum. The feed syrup may be concentrated in a vacuum pan evaporator, in a rising and falling concentrator, or in a heat exchange evaporator under suitable conditions.

The solids content of the feed syrup should be at least 80% sucrose. Non-sucrose solids in the feed syrup may comprise additional mono- or disaccharides or modified dextrins, for example, dextrose, invert sugar, fructose, corn syrup solids, or mixtures thereof.

The resulting supersaturated sugar syrup 14 having a solids content of about 90–98% is maintained at a temperature not less than about 240° F. in order to prevent premature crystallization. A predetermined weight of the food ingredient 16, such as a gelatin, emulsifier, gum, starch, cocoa powder, etc., is added to the concentrated syrup with vigorous mechanical agitation, such as by impact beating, within a crystallization zone. Alternatively, the concentrated sugar syrup may be added to a predetermined amount of the food ingredient and mixed in a similar manner. The device used for mechanical agitation could be a beater-crystallizer, a Turbulizer, a nucleator—crystallizer, a high speed or shear mixer, or a blender.

Impact beating is continued within the crystallization zone until the supersaturated syrup/food ingredient mixture is transformed, crystallized 20, and agglomerated 22. A crystalline sugar incorporated product 24 is recovered from the crystallization zone. The latent heat of crystallization is sufficient to evaporate the moisture so that the product is substantially dry, i.e., has a moisture content of less than about 2.5% by weight. If desired, the crystallized sugar product 24 may be further dried to a moisture content of less than 1%, followed by screening, milling, and packaging 26.

During crystallization, it is desirable to remove the heat of crystallization to prevent overheating within the crystallization zone. The heat of crystallization can be removed or dissipated by indirect heat exchange, e.g., by surrounding the crystallization zone with a water jacket, or, preferably, by forced air flow through the beater-crystallizer, e.g., with a vapor separator.

Suitable apparatus for carrying out the process of the present invention in a continuous operation is described in U.S. Pat. No. 3,365,331 (Miller et al.).

In order to ensure maximum homogeneity in the final product, it is desirable to introduce the food ingredient into the concentration syrup as early in the process as practical. However, in most cases, the food ingredient is introduced during the sugar crystallization step. The food ingredient becomes thoroughly mixed in the earlier stages of the crystallization step as the concentrated syrup is transformed from the liquid state to a semi-solid state. Consequently, when the syrup reaches the relatively dry agglomerated state, the resulting product is a homogeneous blend of the co-crystallized sugar and the food ingredient.

The physical structure of the crystallized sugar product is highly dependent on the rate and temperature of impact beating and crystallization, and on the degree of sugar transformation. The optimum time for the concentrated syrup mixture to spend in the crystallization zone during impact beating depends on several factors, including: (a) the nature of the non-sucrose solids (such as invert sugar and ash) in the feed syrup; (b) the nature and characteristics of the food ingredient (such as moisture content, invert sugar content, pH, etc.); (c) the concentration of the food ingredient in the mixture; and (d) the temperature used for concentration of the food syrup.

In structure, the crystallized sugar products of the present invention are comprised of aggregates or agglomerates of fondant-size sucrose crystals, e.g., in the range of about 3–50 microns, intimately associated with the non-sucrose solids. The agglomerates form a loose, lacey network bonded together at their interfaces by point contact. Accordingly, aqueous liquid can rapidly penetrate the porous cluster of agglomerates and free each of the particles making up the agglomerates. The particles thus become readily dispersed and/or dissolved in the aqueous liquid.

In the crystallized sugar product of the present invention, the food ingredient is incorporated as an integral part of the sugar matrix and there is no tendency for the active ingredient to separate or settle out during handling, packaging, or storage. The resulting product is granular, free-flowing, non-caking, and is readily dispersed or dissolved in water.

The structure and properties of the crystallized sugar products prepared in accordance with this invention are distinctly different from dry-blended sugar products and from sugar products prepared by the seed crystallization process of U.S. Pat. No. 3,248,226 or by the candy melt process of U.S. Pat. No. 3,341,334. For example, a gelatin/sugar product prepared in accordance with this invention is composed of clusters of micro-sized sucrose crystals coated with gelatin. This permits rapid dissolution of the gelatin in cold water. In contrast, a gelatin/sugar product prepared by seed crystallization is composed of large, fluffy crystals which tend to clump and float on the surface when dispersed in a liquid. A gelatin/sugar product prepared by the candy melt process is composed of coarse, dense crystals which sink to the bottom of a liquid.

Typical profiles of emulsifier/sugar products, cocoa/sugar products, and gelatin/sugar products prepared in accordance with this invention are presented in Tables I, II, and III, below.

TABLE I

|  | Mono-glyceride Product | Mono- and Diglycerides Product | Lecithin Product |
|---|---|---|---|
| Preparation Data |  |  |  |
| Elevated Temperature | 255° F. | 265° F. | 260° F. |
| Solids Content of Supersaturated Syrup | 95.4% | 96.5% | 96.1% |
| Crystallization Time | 195 Secs. | 125 Secs. | 165 Secs. |
| Finished Product Analysis |  |  |  |
| Sucrose Content | 94.32% | 92.01% | 89.61% |
| Invert Sugar | 0.12% | 0.10% | 0.09% |

TABLE I-continued

|  | Mono-glyceride Product | Mono- and Diglycerides Product | Lecithin Product |
|---|---|---|---|
| Moisture Content | 0.2% | 0.3% | 0.2% |
| Emulsifier | 5% | 7.5% | 10% |
| Screen Analysis (Tyler) |  |  |  |
| #14 | 2.0% | 3.2% | 6.7% |
| #35 | 4.5% | 6.1% | 11.2% |
| #60 | 32.1% | 40.1% | 36.5% |
| #100 | 34.2% | 24.3% | 34.4% |
| #150 | 21.2% | 21.4% | 10.5% |
| #200 | 4.5% | 4.7% | 0.6% |
| Pan | 1.5% | 0.2% | 0.1% |

TABLE II

|  | Cocoa Product | Cocoa Product |
|---|---|---|
| Preparation Data |  |  |
| Elevated Temperature | 255° F. | 255° F. |
| Solids Content of Supersaturated Syrup | 95.0% | 95.0% |
| Crystallization Time Required | 175 Seconds | 185 Seconds |
| Finished Product Analysis |  |  |
| Sucrose Content | 71.53% | 71.69% |
| Invert Sugar | 0.14% | 0.16% |
| Moisture Content | 0.82% | 0.65% |
| Cocoa Powder | 27.50% | 27.50% |
| Screen Analysis (Tyler) |  |  |
| #14 | 2.4% | 1.6% |
| #35 | 3.2% | 3.5% |
| #60 | 46.5% | 40.6% |
| #100 | 31.8% | 34.6% |
| #150 | 12.4% | 15.9% |
| #200 | 3.2% | 1.4% |
| Pan | 1.5% | 2.4% |

TABLE III

|  | Gelatin Product | Gelatin Product |
|---|---|---|
| Preparation Data |  |  |
| Elevated Temperature | 260° F. | 265° F. |
| Solids Content of Supersaturated Syrup | 95.0% | 96.5% |
| Crystallization Time | 170 Seconds | 185 Seconds |
| Finished Product Analysis |  |  |
| Sucrose Content | 88.53% | 78.31% |
| Invert Sugar | 0.14% | 0.16% |
| Moisture Content | 1.05% | 1.45% |
| Gelatin Powder | 10% | 20% |
| pH | 4.98 | 4.90 |
| Color (10% Solution) | 69 ASC Units | 73 ASC Units |
| Screen Analysis (Tyler) |  |  |
| #14 | 2.4% | 1.6% |
| #35 | 3.2% | 3.5% |
| #60 | 46.5% | 40.6% |
| #100 | 31.8% | 34.6% |
| #150 | 12.4% | 15.9% |
| #200 | 3.2% | 1.4% |
| Pan | 1.5% | 2.4% |

A wide variety of products may be prepared in accordance with the present invention. These products may be either intermediate food products or instant food products. By instant food products, it is meant that the product contains all of the dry food ingredients needed to make the final food. In contrast, intermediate food products, such as concentrates, must be blended with other food ingredients to make the food. In the preparation of intermediate food products or concentrates, it is desirable that the amount of food ingredient contained in the sugar incorporated product be equal to or less than the total amount of sugar in the syrup, i.e., the food ingredient should comprise about 0.05–50% by weight of the crystallized sugar product.

The following examples illustrate various embodiments of this invention but are not meant in any way to limit the scope thereof.

A dry, readily dispersible gelatin concentrate may be prepared in accordance with this invention. Desirably, the product contains about 0.5–30% by weight gelatin.

EXAMPLE 1

A sugar solution of 65° Brix was heated to 255° F. to form a supersaturated syrup of approximately 95% solids content. An amount of gelatin equal to 10% by weight of the sugar was then added with controlled agitation (impact beating). Impact beating was continued until the mixture was converted into a substantially dry powder. As the crystallization of the sugar proceeded, the gelatin particles were incorporated into the sugar matrix of fondant-size sucrose crystals. The heat of crystallization which accompanied the reaction aided in removing moisture to give a substantially dry powdered product.

EXAMPLE 2

A gelatin/sugar product was prepared as in Example 1 except that, instead of adding the gelatin to the supersaturated sugar solution, the supersaturated sugar solution was added to the gelatin with impact beating. Impact beating was continued and crystallization proceeded, eventually resulting in the formation of a dry powdered product.

EXAMPLE 3

1300 grams of sucrose solution (65° Brix) was heated to 265° F. to form a supersaturated syrup of approximately 97% solids. 200 grams of gelatin powder (through a Tyler #100 mesh screen) was added to the heating syrup with vigorous mechanical agitation using a Hobart mixer. Stirring was continued until the mixture was transformed and agglomerated into a dry powder. The finished product was screened through a Tyler #35 mesh screen.

Gelatin concentrates made in this manner were used in the formation of several food products containing gelatin, such as, marshmallow mix, stabilized icing mix, and gelatin dessert mix. The product was readily dispersed and dissolved in either hot or cold water and formed a firm gelled or stabilized product.

In another embodiment of the present invention, various stabilizers, such as pectin, carrageenan, guar gum, agar-agar, xanthan gum, or sodium alginate may be incorporated into a crystallized sugar product. Desirably, the product comprises about 0.1–25% by weight of the solution.

EXAMPLE 4

A sugar incorporated pectin was prepared in accordance with the process described in Example 3. This pectin concentrate was then used in the formulation of several food products, such as jelly mix, syrup spread mix, and beverage drink mix. The finished products possessed an instantly dispersing and dissolving nature when mixed with hot or cold water without any detectable lumping. They provide a firm gelled texture or a stabilizing or thickening property similar to that of products prepared by conventional processes.

In another embodiment, various emulsifiers, such as mono- and diglycerides, propylene glycol esters, sorbitan esters, polyoxyethylene sorbitan esters, lactylated esters, or lecithins, may be incorporated into a crystallized sugar product. Desirably, the product comprises 0.1–25% by weight of the stabilizer.

EXAMPLE 5

A sugar solution of 65° Brix was heated to 255° F. to form a supersaturated syrup of approximately 95% solids content. An amount of monoglycerol (Myverol 18-07, Kodak) equal to 5% by weight of the sugar was then added with controlled agitation (impact beating). Impact beating was continued until the mixture was converted into a substantially dry powder. As the crystallization of the sugar proceeded, the emulsifier was incorporated with the fondant-size sugar particles into a sugar matrix. The heat of crystallization which accompanied the reaction aided in removing moisture resulting in a substantially dry powdered product. The finished product was screened through a Tyler #35 mesh screen.

EXAMPLE 6

An emulsifier/sugar product was prepared as in Example 5 except that the supersaturated sugar solution was added to the emulsifier with impact beating. Impact beating was continued and crystallization proceeded, eventually resulting in the formation of a dry powder similar to that of Example 5.

EXAMPLE 7

A sugar incorporated monoglyceride product was prepared according to the process described in Example 3. The product prepared in this manner was used in the formulation of several food products, such as, cake mix and icing mix. The crystallized product, when added to cake mix or icing mix, provides excellent emulsion characteristics. For example, cake volume, porosity, and appearance, and icing stability and density were improved with the sugar incorporated emusifier as compared with a conventional emulsifier.

In another embodiment, a cocoa or carob product may be prepared in accordance with the present invention. Desirably, the product comprises about 0.5–35% by weight cocoa or carob.

EXAMPLE 8

A sugar solution of 65° Brix was heated to 255° F. to form a supersaturated syrup of approximately 95% solids content. An amount of cocoa powder (Hershey Challenge No. 100) equal to 25% by weight of the sugar solution was then added with controlled agitation. Stirring of the sugar solution and the cocoa powder resulted in the formation of a slurry and coating of the cocoa particles with the syrup. Stirring was continued until the mixture was converted into a dry powder. As the crystallization of the sugar proceeded, the cocoa powder particles were incorporated with the crystallization sugar. The heat of crystallization which accompanied the reaction aided in removing moisture and gave a substantially dry powdered product.

EXAMPLE 9

A cocoa/sugar product was prepared as in Example 8 except that the supersaturated sugar solution was added to the cocoa powder with agitation to form a slurry, thereby coating the cocoa powder with the syrup. Agitation was continued and crystallization was continued, eventually resulting in the formation of a dry powdered product similar to that of Example 8.

EXAMPLE 10

580 grams of granulated sugar and 200 grams of brown sugar were dissolved in water and the solution heated until a product was obtained which contained 96% solids. 200 grams of cocoa powder supplied by Hershey was added to the supersaturated syrup with agitation. Stirring was continued until the mixture was transformed into a dry powder. The finished product was then screened through a Tyler #35 mesh screen. The sugar incorporated cocoa product was used in the formulation of several food products containing cocoa, such as chocolate milk drink and pudding. These products were readily dispersible in cold water without any evidence of lumping.

In another embodiment, various modified starches, such as, waxy maize starch, tapioca starch, corn starch, or wheat starch, may be incorporated into a crystallized sugar product. Desirably, the product comprises about 0.5–35% by weight starch.

EXAMPLE 11

The modified starch (Stir-N-Set, National Starch)-/sugar product was prepared according to the process described in Example 10. The sugar incorporated modified starch was used in the formulation of several instant food products containing starch, such as, pie filling, pastry filling, pudding, and spoonable salad dressings. This product was readily dispersible in cold water without mechanical agitation.

In another embodiment, various fibers, such as corn bran, soy hulls, beet pulps, or wood cellulose, may be incorporated into a crystallized sugar product. The fibers may be acidic, enzymatic, or oxidized modified such as alpha-cellulose, microcrystalline cellulose or other cellulosic fibers. Desirably, the product comprises about 0.5–35% by weight fiber.

EXAMPLE 12

A sugar solution of 65° Brix was heated to 255° F. to form a supersaturated sugar solution of approximately 95% solids content. An amount of alpha-cellulose (Paniplus, Keycel BH 200) equal to 25% by weight of the sugar solution was then added with controlled agitation. Stirring was continued until the moisture was converted into a dry powder. The incorporated product permits ready or instant dispersibility in liquid.

In another embodiment, various proteins, such as soy proteins, yeast proteins, milk proteins, wheat proteins, or egg proteins, are incorporated into a crystallized sugar product. The proteins may be acidic, enzymatic, or oxidized modified, such as, caseinates, lactalbumen, wheat gluten, or soy albumen. Desirably, the product comprises about 0.5–35% by weight protein.

EXAMPLE 13

950 grams of granulated sugar and 50 grams of total invert sugar were dissolved in water and the solution was heated until a product was obtained which contained 96% solids. 300 grams of soy protein concentrates produced by Far-Mar, Inc. was added to the supersaturated sugar solution with agitation. Stirring was continued until the mixture was transformed into a substantially dry product. As the crystallization of the sugar proceeded, the soy protein particles were incorporated into the crystallized sugar. The heat of crystallization, which developed during the exothermic reaction, aided in removing moisture, resulting in a substantially dry particle.

In another embodiment, various sugar substitutes, such as saccharin and its salts, aspartame (aspartyl-phenylalanine-methyl-ester), glycyrrhizin and its derivatives, cyclamate and its salts, miraculin (synsepalum dulsificum), sorbitol, mannitol, or xylitol, are incorporated into a crystalline sugar matrix. Desirably, the product comprises up to 50% by weight sugar substitute.

EXAMPLE 14

A sugar solution prepared from 92% sucrose and 8% aspartame (dry weight basis) was heated to 260° F. to form a supersaturated syrup of approximately 93.5% solids content. The heated syrup was subjected to mechanical agitation (impact beating). Impact beating was continued until the mixture was transformed and agglomerated into a dry powder. As the transformation of the sugar proceeded, the synthetic sweetener cocrystallized with the fondant size sugar particles. The heat of crystallization aided in removing moisture, resulting in a substantially "dry" product. The finished product was screened to a uniform size through a Tyler No. 28 mesh screen. The cocrystallized product made in this manner was used as a low calorie sugar product. Assuming aspartame is 200 times as sweet as sucrose, 0.5 gram of the aspartame-sucrose product containing 2 calories provides the same sweetness as one teaspoonful (4.5 grams) of sugar containing 18 calories.

EXAMPLE 15

The incorporation method used was the same as that described in Example 14. However, instead of an aspartame-sugar solution, a saccharin-sugar solution containing 99.8% of conventional brown sugar and 0.2% saccharin (dry weight basis) was used. The cocrystallized product has the same sweetness as sucrose with one-half the caloric content. The relative sweetness of saccharin was assumed to be 550 times that of sucrose.

EXAMPLE 16

An instant chocolate pudding was prepared by dry blending the following ingredients:
170.0 grams of pregelatinized starch
110.0 grams of cocoa powder (Hershey)
15.0 grams of tetrasodium pyrophosphate
8.0 grams of disodium phosphate
2.0 grams of monosodium phosphate
10.0 grams of calcium acetate
5.0 grams of non-fat dry milk solids.
480 grams of granulated sugar and 200 grams of brown sugar were dissolved in 300 grams of water, and then cooked to 265° F. The hot syrup was added to the dry blend with agitation until complete crystallization was obtained. The final product was screened through a Tyler #35 mesh screen.

120 grams of this material dispersed instantly in two cups of cold milk and produced a firm pudding after 10 minutes at refrigeration temperatures.

EXAMPLE 17

An instant chocolate milk drink was prepared in accordance with the present invention. 800 grams of granulated sugar was dissolved in 300 ml. of water and then heated to 270° F. The hot syrup was then added to 200 grams of carrageenan with agitation. The agitation was continued until a dry granular product was obtained. The finished product was screened through a #28 mesh screen. 25 grams of this material dispersed rapidly in one cup of cold milk and produced a chocolate milk drink with good flavor and body.

EXAMPLE 18

An instant gelatin dessert mix was prepared by dissolving 800 grams of granulated sugar in 300 ml. of water at 270° F. To this syrup was added 80 grams of gelatin powder, 1 gram of citric acid, and 0.1 cc of artificial strawberry flavor mix with agitation to form a dry product. The finished product was screened through a Tyler #28 mesh screen. 20 grams of the finished product was easily dispersed with slight agitation in one cup of cold water and produced a good, firm gelled dessert after 2.5 hours of refrigeration.

EXAMPLE 19

An instant ice cream mix was prepared by dry blending the following ingredients in a Hobart mixer:
350 grams of spray-dried butter supplied by Borden
210 grams of non-fat dry milk solids
10 grams of stabilizer (sodium alginate)
0.5 grams of di- and monoglycerides
Coloring and flavoring (as desired).
440 grams of granulated sugar was dissolved in 350 grams of water and heated to 270° F. The hot syrup was added to the dry blend with agitation until complete crystallization was obtained. 42.5 grams of this material dispersed easily in 70 grams of cold water and produced a stabilized ice cream after blending in a Waring Blender and aging in a freezer.

EXAMPLE 20

A chocolate sugar product was prepared by dry blending the following ingredients in a Hobart mixer:
150 grams of cocoa powder
100 grams of milk solids
5 grams of pure vanilla powder
2 grams of caramel color.
753 grams of brown sugar was dissolved in water and heated to 265° F. The hot syrup was added to the dry blend with mechanical agitation until complete crystallization was obtained. The incorporated product has an instantly dispersible property when mixed with a liquid, such as cold milk.

EXAMPLE 21

A nutritional supplement was prepared by dry blending 45 grams of essential amino acids with 100.7 grams of partially hydrogenated soybean oil and emulsifier. 846 grams of brown sugar was dissolved in water and heated to 265° F. The hot syrup was added to the dry blend with vigorous agitation until crystallization was complete. The sugar matrix acted as a carrier for the nutrients and resulted in a free-flowing, stable, nonperishable dry powder.

EXAMPLE 22

A dry cake base was prepared by dry blending 370 grams of cake flour, 130 grams of shortening, and 20 grams of dry milk. 426 grams of sugar was dissolved in water and heated to 250° F. The supersaturated sugar syrup was then added to the dry blend with mechanical agitation until the sugar was transformed. The cake base was mixed with other ingredients (egg white, baking powder, emulsifier and flavors) by dry blending to form a complete cake mix. Due to the formation of sugar/flour/fat agglomerates by the sugar transforming process, the cake prepared from this cocrystallized mix has a higher volume (porosity) and better appearance than that prepared from a traditional dry blended product.

EXAMPLE 23

A complete coffee beverage mix was prepared by dry blending 200 grams of instant coffee and 200 grams of nondiary cream. 800 grams of sugar was dissolved in water and heated to 270° F. The supersaturated sugar syrup was then added to the dry blend with mechanical agitation until the sugar was transformed. The incorporated product is a free-flowing, homogeneous, granulated powder with instantly dispersible property. A complete coffee drink can be prepared by reconstitution of 12 grams of this base with 1 cup of hot water. Similarly, a complete instant tea mix can also be produced in the same manner by incorporating instant tea powder and other ingredients into the sugar crystals.

All of the sugar incorporated products of the present invention are dry, granular, free-flowing, and noncaking. They are readily dispersible or dissolved in water. In addition, they are homogeneous and do not separate or settle out.

While the invention has been described with reference to specific embodiments, these were for purposes of illustration only and should not be construed to limit the scope of the present invention.

We claim:

1. A method for preparing a crystallized sugar product containing a food ingredient, comprising:
   (a) concentrating a sugar syrup at a temperature in the range of about 250° F. to about 300° F. to a solids content of about 90% to 98% by weight, said sugar syrup containing no more than about 20% by weight of non-sucrose solids;
   (b) admixing the concentrated sugar syrup with a predetermined amount of the food ingredient;
   (c) subjecting the admixture to impact bearing within a crystallization zone until a crystallized sugar product is formed, said crystallized sugar product made up of aggregates of fondant-size sucrose crystals and the food ingredient and having a moisture content of less than 2.5% by weight; and
   (d) recovering said crystallized sugar product from said crystallization zone.

2. The method of claim 1 further comprising drying said crystallized sugar product to a moisture content of less than about 1% by weight.

3. A crystallized sugar product made in accordance with the method of claim 1 wherein said food ingredient comprises, on a dry weight basis, about 0.05% to about 50% of the crystallized sugar product.

4. The crystallized sugar product of claim 3 wherein said food ingredient is an emulsifier.

5. The crystallized sugar product of claim 4 comprising, on a dry weight basis, about 0.1% to about 25% by weight of monoglycerides, diglycerides, propylene glycol esters, sorbitan esters, polysorbate esters, polyoxyethylene sorbitan esters, lactylated esters, or lecithins.

6. The crystallized sugar product of claim 3 wherein the food ingredient is gelatin.

7. The crystallized sugar product of claim 6 comprising, on a dry weight basis, about 0.5% to about 30% gelatin.

8. The crystallized sugar product of claim 3 wherein the food ingredient is a stabilizer.

9. The crystallized sugar product of claim 8 comprising, on a dry weight basis, about 0.1% to about 25% of pectin, carrageenan, guar gum, agar-agar, xanthan gum or sodium alginate.

10. The crystallized sugar product of claim 3 wherein the food ingredient is cocoa or carob.

11. The crystallized sugar product of claim 10 comprising, on a dry weight basis, about 0.5% to about 35% of cocoa or carob.

12. The crystallized sugar product of claim 3 wherein the food ingredient comprises a modified starch.

13. The crystallized sugar product of claim 12 comprising, on a dry weight basis, about 0.5% to about 35% of waxy maize starch, tapioca starch, corn starch, or wheat starch.

14. The crystallized sugar product of claim 3 wherein the food ingredient is an edible fiber.

15. The crystallized sugar product of claim 14 wherein the fiber is acidic, enzymatic, or oxidized modified.

16. The dry crystallized sugar product of claim 14 comprising, on a dry weight basis, about 0.5% to about 35% of alpha-cellulose, microcrystalline cellulose, corn bran, soy hulls, beet pulp, wood cellulose, or other cellulosic fibers.

17. The crystallized sugar product of claim 3 wherein the food ingredient is a protein.

18. The crystallized sugar product of claim 17 comprising, on a dry weight basis, about 0.5% to about 35% of soy proteins, yeast proteins, milk proteins, wheat proteins, egg proteins, caseinates, lactalbumen, wheat gluten, or soy albumen.

19. The crystallized sugar product of claim 3 wherein said food ingredient is a sugar substitute.

20. The crystallized sugar product of claim 19 comprising, on a dry weight basis, about 0.05% to about 50% of saccharin and its salts, aspartame, glycyrrhizin and its derivatives, cyclamate and its salts, miraculin, sorbitol, mannitol, or xylitol.

21. A crystallized sugar product made in accordance with the method of claim 1 wherein said crystallized sugar product comprises an instant food product.

22. An instant chocolate pudding product made in accordance with the method of claim 1.

23. The instant chocolate pudding product of claim 22 comprising, on a dry weight basis, about 10% to about 20% starch, about 5% to about 15% cocoa, about 0% to about 3% tetrasodium pyrophosphate, about 0% to about 2% disodium phosphate, about 0% to about 0.5% monosodium phosphate, about 0% to about 2% calcium acetate, about 0% to about 1.0% non-fat dry milk solids, and the remainder substantially sugar.

24. An instant chocolate milk product made in accordance with the method of claim 1.

25. The instant chocolate milk product of claim 24 comprising, on a dry weight basis, about 15% to about 25% cocoa, about 0% to about 5% carrageenan, and the remainder substantially sugar.

26. An instant gelatin product made in accordance with the method of claim 1.

27. The instant gelatin product of claim 26 comprising, on a dry weight basis, about 5% to about 15% gelatin, about 0% to about 0.4% citric acid, about 0.01% flavoring, and the remainder substantially sugar.

28. An instant ice cream product made in accordance with the method of claim 1.

29. The instant ice cream product of claim 28 comprising, on a dry weight basis, about 30% to about 40% butter, about 15% to about 25% dry milk solids, about 0% to about 2% stabilizer, about 0% to about 0.1% mono- and di- glycerides, about 0% to about 0.1% coloring and flavoring, and the remainder substantially sugar.

30. An instant chocolate sugar product made in accordance with the method of claim 1.

31. The instant chocolate sugar product of claim 30 comprising, on a dry weight basis, about 10% to about 20% cocoa, about 5% to about 15% milk solids, about 0% to about 1% vanilla, about 0% to about 0.2% caramel color, and the remainder substantially sugar.

32. An instant nutritional supplement made in accordance with the method of claim 1.

33. The instant nutritional supplement of claim 32 comprising, on a dry weight basis, about 2% to about 10% essential amino acids, about 5% to about 15% partially hydrogenated soybean oil and emulsifier, and the remainder substantially sugar.

34. An instant cake base made in accordance with the method of claim 1.

35. The instant cake base of claim 34 comprising, on a dry weight basis, about 30% to about 50% flour, about 10% to about 15% shortening, about 1% to about 5% dry milk, and the remainder substantially sugar.

36. An instant coffee or tea product made in accordance with the method of claim 1.

37. The instant coffee or tea product of claim 36 comprising, on a dry weight basis, about 10% to about 35% instant coffee or tea, about 10% to about 35% non-dairy cream, and the remainder substantially sugar.

* * * * *

UNITED STATES PATENT AND TRADEMARK OFFICE
CERTIFICATE OF CORRECTION

PATENT NO. : 4,338,350
DATED : July 6, 1982
INVENTOR(S) : ANDY C.C. CHEN ET AL

It is certified that error appears in the above-identified patent and that said Letters Patent are hereby corrected as shown below:

Cover Page, delete drawing appearing thereon as never having been a part of application from which issued patent is derived.

Cover Page, under "Abstract", line 8, change "bearing" to read -- beating --

Column 7, line 43, change "emusifier" to read -- emulsifier --

Column 11, line 44, change "bearing" to read -- beating --

Signed and Sealed this

Fourth Day of January 1983

[SEAL]

Attest:

GERALD J. MOSSINGHOFF

Attesting Officer   Commissioner of Patents and Trademarks